US009162765B2

(12) United States Patent
Huber

(10) Patent No.: US 9,162,765 B2
(45) Date of Patent: Oct. 20, 2015

(54) LOADING SYSTEM FOR AN AIRCRAFT AND METHOD FOR CONVEYING A PIECE OF CARGO ON A CARGO DECK

(75) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 196 days.

(21) Appl. No.: 13/979,611

(22) PCT Filed: Jan. 18, 2012

(86) PCT No.: PCT/EP2012/050716
§ 371 (c)(1),
(2), (4) Date: Jul. 12, 2013

(87) PCT Pub. No.: WO2012/098161
PCT Pub. Date: Jul. 26, 2012

(65) Prior Publication Data
US 2013/0297065 A1    Nov. 7, 2013

(30) Foreign Application Priority Data

Jan. 19, 2011  (DE) .......................... 10 2011 000 221
Feb. 18, 2011  (DE) .......................... 10 2011 000 819

(51) Int. Cl.
*G06F 7/00* (2006.01)
*B64D 9/00* (2006.01)
*B64C 1/22* (2006.01)

(52) U.S. Cl.
CPC ..... *B64D 9/00* (2013.01); *B64C 1/22* (2013.01)

(58) Field of Classification Search
None
See application file for complete search history.

(56) References Cited

U.S. PATENT DOCUMENTS

| 4,050,655 | A | 9/1977 | Bogue et al. |
| 2006/0038077 | A1 | 2/2006 | Olin et al. |
| 2009/0121084 | A1* | 5/2009 | Hettwer ..................... 244/137.1 |
| 2009/0319165 | A1 | 12/2009 | Eadie |
| 2010/0100225 | A1* | 4/2010 | Reed et al. .................... 700/213 |

FOREIGN PATENT DOCUMENTS

| DE | 19807229 A1 | 2/1999 |
| DE | 10158298 C1 | 10/2003 |
| DE | 102005026898 A1 | 1/2006 |
| DE | 102008052432 A1 | 5/2009 |
| DE | 102008052468 A1 | 5/2009 |
| DE | 102005008443 B4 | 6/2009 |
| DE | 102009037982 A1 | 5/2010 |
| DE | 102005021078 B4 | 7/2010 |

(Continued)

OTHER PUBLICATIONS

PCT International Search Report, PCT Application PCT/EP2012/050716, dated May 25, 2012.

(Continued)

*Primary Examiner* — Yolanda Cumbess
(74) *Attorney, Agent, or Firm* — Barnes & Thornburg LLP

(57) ABSTRACT

The invention concerns a loading system for an aircraft, wherein the loading system comprises a control computer; a multiplicity of cargo conveying devices for conveying a piece of cargo on a cargo loading deck of the aircraft, wherein to control the cargo conveying devices, the control computer is communicatively connected with the cargo conveying devices; at least one input device which is communicatively connected with the control computer to transfer user inputs to the control computer. An aspect of the invention is that the one input device may be formed as a touchscreen.

15 Claims, 4 Drawing Sheets

(56) References Cited

FOREIGN PATENT DOCUMENTS

Figure 1:
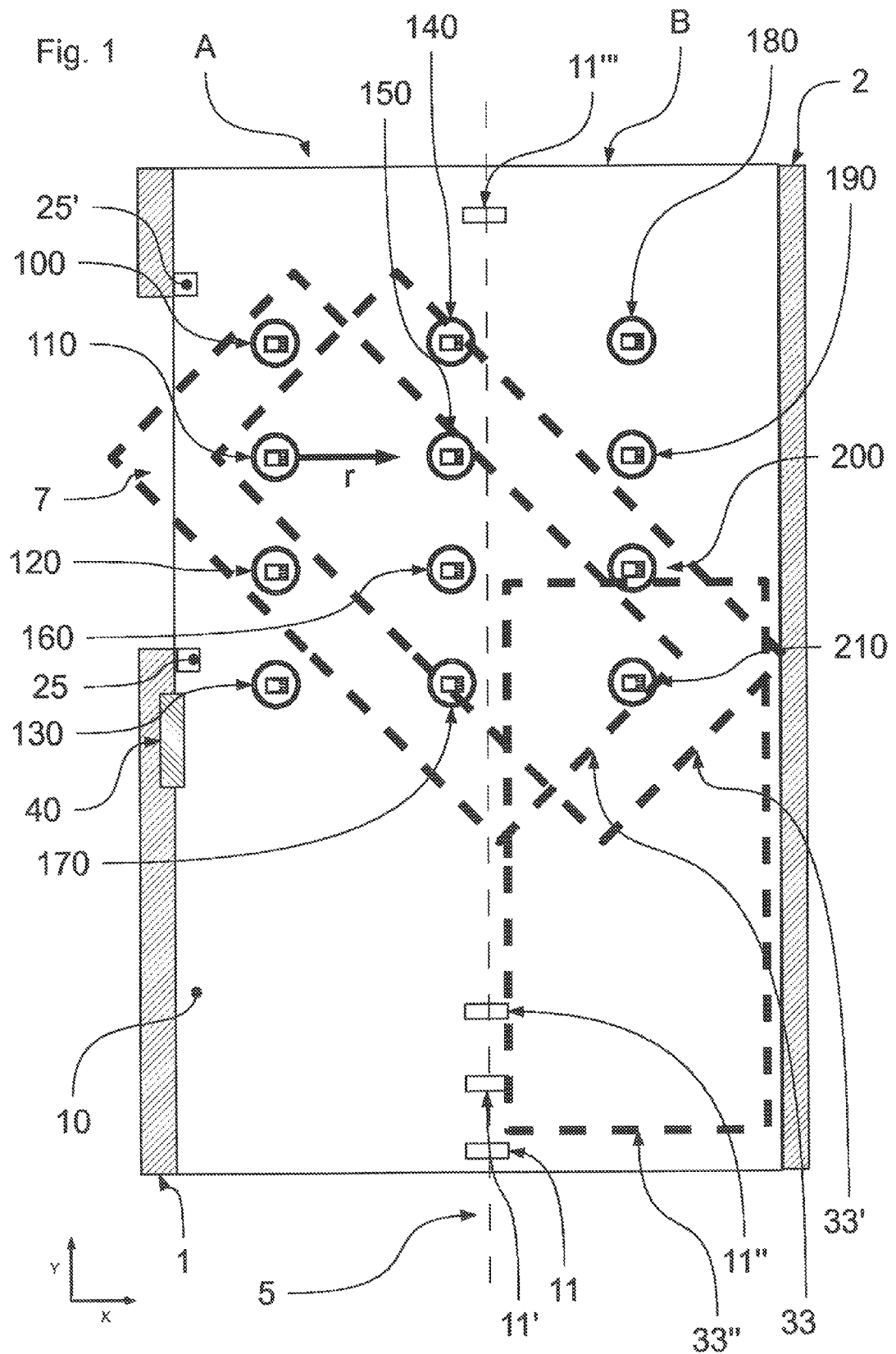

| | | |
|---|---|---|
| WO | 2007106191 A2 | 9/2007 |
| WO | 2010096146 A1 | 8/2010 |

OTHER PUBLICATIONS

English translation of PCT International Report on Patentability and Written Opinion in PCT Application PCT/EP2012/050716, dated Jul. 23, 2013.

* cited by examiner

LOADING SYSTEM FOR AN AIRCRAFT AND METHOD FOR CONVEYING A PIECE OF CARGO ON A CARGO DECK

RELATED APPLICATIONS

This patent application is a U.S. nationalization under 35 U.S.C. §371 of International Application No. PCT/EP2012/050716, filed Jan. 18, 2012, which claims priority to German Patent Application No. 10 2011 000 221.9, filed Jan. 19, 2011 and German Patent Application No. 10 2011 000 819.5, filed Feb. 18, 2011.

BACKGROUND AND SUMMARY

The invention concerns a loading system for an aircraft and a method for conveying a piece of cargo on a cargo deck.

For air freight transport, the pieces of cargo to be transported, in particular containers or pallets which are preferably produced to specific standards, are secured in the hold by means of lock elements on the cargo deck of the hold. Such lock elements frequently form cargo loading tracks between which the standardised pieces of cargo can be positioned. To position the pieces of cargo at the positions provided for them, loading systems are used which support the ground staff during loading and unloading. The loading systems are intended to accelerate the loading and unloading process and frequently have a multiplicity of actuators and sensors and a control computer which is adapted to analyse the signals received, where applicable emit signals, and implement a suitable strategy for the actuators. The loading systems used must be very simple to operate since the ground staff frequently receive no instructions concerning a specific loading system. In addition both the loading and unloading take place under great pressure of time, whereby incorrect operation can easily occur. Such incorrect operation must absolutely be prevented.

A defective loading system—either due to incorrect operation or due to natural wear—can lead to substantial costs since maintaining wide-bodied aircraft is very expensive. Every minute which a wide-bodied aircraft spends on the ground costs the operator money. Furthermore a defective cargo loading system or incorrect operation can for example lead to damage to sections of the cargo hold. Repair of the cargo hold is very costly.

Frequently pieces of cargo are loaded on a cargo deck which have dimensions such that it is necessary to rotate the pieces of cargo, in particular in the region close to the door. The region close to the door, here also called the loading and unloading region, is for this reason fitted with particular function elements, comprising cargo conveying devices (e.g. PDUs or power drive units) and roller mats. There are various strategies for achieving the rotation of the pieces of cargo in the physically very restricted loading and unloading region. Corresponding cargo loading systems or loading systems for rotating pieces of cargo are known from U.S. Pat. No. 4,050,655, DE 10 2005 008 443 B4, DE 10 2005 021 078 B4, DE 10 2008 052 468 A1 and DE 101 58 298 C1.

Thus for example U.S. Pat. No. 4,050,655 discloses a loading system for an aircraft which comprises a control computer and a multiplicity of cargo conveying devices communicatively connected with the control computer. The control computer actuates the cargo conveying devices such that the pieces of cargo are positioned suitably on the cargo loading deck. Furthermore the control computer allows rapid and simple unloading. The control computer is also in communicative connection with an input device, namely a panel with a multiplicity of buttons and a joystick which enables the user to undertake the loading and unloading process manually. The proposed input device can only be actuated with difficulty when wearing the gloves prescribed for loading and unloading. Furthermore operation of the input device is not necessarily intuitive, so that the users must be trained accordingly.

Starting from U.S. Pat. No. 4,050,655, the object of the present invention is to provide an improved loading system which in particular can be operated easily and intuitively and which guarantees an at least partially automatic loading and unloading of pieces of cargo. This object is achieved by a loading system according to claim 1 and a method according to claim 10.

In particular the object is achieved by a loading system for an aircraft which comprises:

a control computer;

a multiplicity of cargo conveying devices for conveying a piece of cargo on a cargo loading deck of an aircraft, wherein to control the cargo conveying devices the control computer is communicatively connected with the cargo conveying devices;

at least one input device which is communicatively connected with the control computer to transfer user inputs to the control computer.

A central concept of the present invention is to form the input device in the form of a touchscreen.

To this extent it is possible to make inputs comfortably directly on a screen using the fingers. The elements displayed on the touchscreen can be modified depending on the loading phase (e.g. loading or unloading) to increase the user comfort. Furthermore a touchscreen allows the display of decisive information while at the same time functioning as an input device. This can help avoid incorrect operation.

The cargo loading system can comprise sensor devices to detect an actual position of the piece of cargo to be loaded. For example by means of sensor devices, it can be established where a piece of cargo is located on or in relation to the cargo deck. The sensor devices can for example report to the control computer that a portion of the piece of cargo has just passed the cargo loading hatch, so that from this information the control computer can determine the actual position of the piece of cargo.

This is particularly advantageous if the touchscreen is formed and/or controlled by the control computer such that the touchscreen shows at least an outline of the piece of cargo. The user of the loading system can then, by means of the touchscreen, select the piece of cargo or a portion of the piece of cargo and/or specify at least one transport direction and/or conveyor track. Preferably the user input can also consist of the user, for example with his finger, selecting the outline of the piece of cargo shown on the touchscreen and then dragging it into a specific nominal position. Alternatively only portions of the outline of the piece of cargo are selected and moved using a finger. Preferably the control computer implements a suitable control strategy as a function of user input so that the piece of cargo is transported accordingly on the cargo deck by means of the cargo conveying devices. The specified transport direction need not necessarily correspond to a vector. Theoretically it is also possible to specify a curved track or similar.

The touchscreen can also be formed to detect at least two contact points simultaneously so that a user of the loading system can specify a rotation movement. For example it is possible to form the touchscreen such that it detects the coordinates of two fingers on the touchscreen and follows their movement over time. Thus rotation movements can be specified in a simple and efficient manner.

The control computer can be formed, taking into account user inputs, to calculate a transport strategy and actuate the cargo conveying device to implement the transport strategy. The control computer thus implements a movement specified on the touchscreen and/or a rotation of the piece of cargo by suitable control of the cargo conveying devices.

The control computer can also be formed to actuate the cargo conveying devices only as long as a contact by the user is detected by the touchscreen. Thus the user can for example specify a movement direction by means of a finger. The control computer then begins to actuate the conveying devices such that the piece of cargo is suitably moved and/or rotated on the cargo deck. The control computer can be formed such that it actuates the transport of the piece of cargo only until the target position specified by the user has been reached or the latter has removed his finger from the touchscreen. To this extent a safety mechanism can be implemented which allows rapid stoppage of the piece of cargo on the cargo deck in order to avoid damage to the aircraft or pieces of cargo, and/or danger to personnel.

Insofar as the touchscreen is formed to determine the coordinates of at least two contact points, actuation of the conveying devices can then be interrupted if only one finger is in contact with the touchscreen or no fingers are in contact with the touchscreen.

The touchscreen can be formed and/or controlled by the control computer such that the touchscreen displays at least a portion of the cargo loading deck so that a user of the loading system, by means of the touchscreen, can select at least one target position, in particular a cargo loading track. Preferably the loading system according to the invention supports a manual and an automatic loading of pieces of cargo. For automatic loading, the user merely specifies a target position, for example in the form of selection of a cargo loading track, wherein the control computer automatically develops a control strategy which leads to the piece of cargo being moved from its current position to the specified target position. On unloading, this target position can also lie outside the aircraft.

The loading system can comprise sensor devices to detect the type and/or a dimension of a piece of cargo, in particular the base surface of the piece of cargo. In one embodiment example the base surface can be measured for example on introduction into the aircraft and be taken into account by the control computer on development of a suitable control strategy. Alternatively corresponding dimensions can be stored in a digital memory on the piece of cargo, so that the dimensions can be read by the control computer. Furthermore it is possible to store identification numbers, which relate for example to the type of cargo, in or on the piece of cargo and compare these numbers with a database which provides the dimensions as a function of the identification number. It is conceivable to obtain by means of the sensor devices information relating to dimensions of the base surface of the piece of cargo. Secondly information can also be obtained which allows the generation of a three-dimensional image of the piece of cargo, so that a collision for example with the outer skin of the aircraft can be effectively avoided on loading or unloading of the piece of cargo.

The object cited initially is furthermore achieved by a method for conveying a piece of cargo on a cargo deck which comprises the following steps:

reception by a control computer of at least one user input entered by means of a touchscreen;

calculation of a control strategy as a function of the user input;

actuation of a number of cargo conveying devices according to the control strategy.

Similar advantages arise to those already discussed in connection with the device.

The method can also comprise reception by the control computer of a plurality of sensor signals to determine an actual position of the piece of cargo on the cargo deck, and display on the touchscreen of the actual position of the piece of cargo, in particular in relation to the design of at least one part of the cargo deck. For the user it is therefore possible to derive an actual position of the piece of cargo from the display on the touchscreen, and by suitable inputs specify a transport direction or transport strategy.

Preferably the actual position of the piece of cargo is updated in real time so that the user is always shown on the touchscreen the current position of the piece of cargo.

In one embodiment example, actuation of the number of cargo conveying devices can take place only as long as the touchscreen detects a contact by the user. As soon as the touchscreen establishes that the user is no longer touching this, transport of the piece of cargo can be stopped.

The method can comprise detection by at least one sensor device of a type and/or at least one dimension of the piece of cargo, and taking into account the type and/or dimension of the piece of cargo in calculation of the control strategy. For example the control computer can generate a digital image of the piece of cargo and develop a suitable control strategy which transports the piece of cargo from the current position into a nominal position specified by the user without collision with the aircraft. The user input can comprise a predefinition of an acceleration direction and an acceleration force, and from the user input the control computer can determine a transport direction and a transport time period. For example it is possible that by his input the user specifies a movement vector of a particular length. The control computer can then develop a control strategy to transport the piece of cargo in the specified direction. The distance over which the piece of cargo is transported in the specified direction can for example be determined as a function of the vector length. Preferably first a rapid transport of the piece of cargo takes place in the specified direction, wherein the speed diminishes slowly as the time increases so that the piece of cargo "rolls out" onto the cargo deck.

The above object is furthermore achieved by a loading system for an aircraft comprising a remote control to receive user inputs and a wireless communication interface to pass on the user inputs to a control computer.

Preferably the wireless communication is achieved at least by a transmission device on the remote control and a receiver device on the at least one cargo conveying device. Preferably this wireless communication takes place by means of light waves, in particular in the infrared range. The cargo conveying device for this can have corresponding photo diodes. These photo diodes can also be used as sensor means to detect the presence of a piece of cargo, in particular above the cargo conveying device. The sensor means thus fulfil a dual function, firstly as receiver and/or as transmitter, and secondly as a detection device.

DESCRIPTION OF THE DRAWING FIGURES

The invention is described below with reference to several embodiment examples which are explained in more detail by means of various figures.

Figure 2:
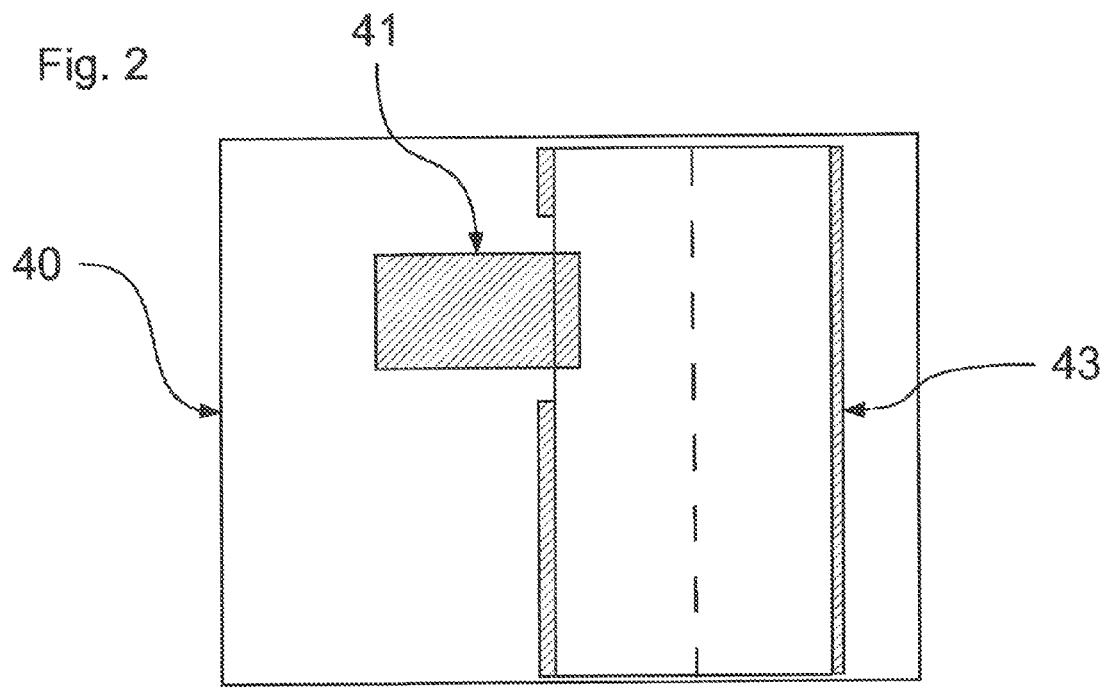
Figure 3:
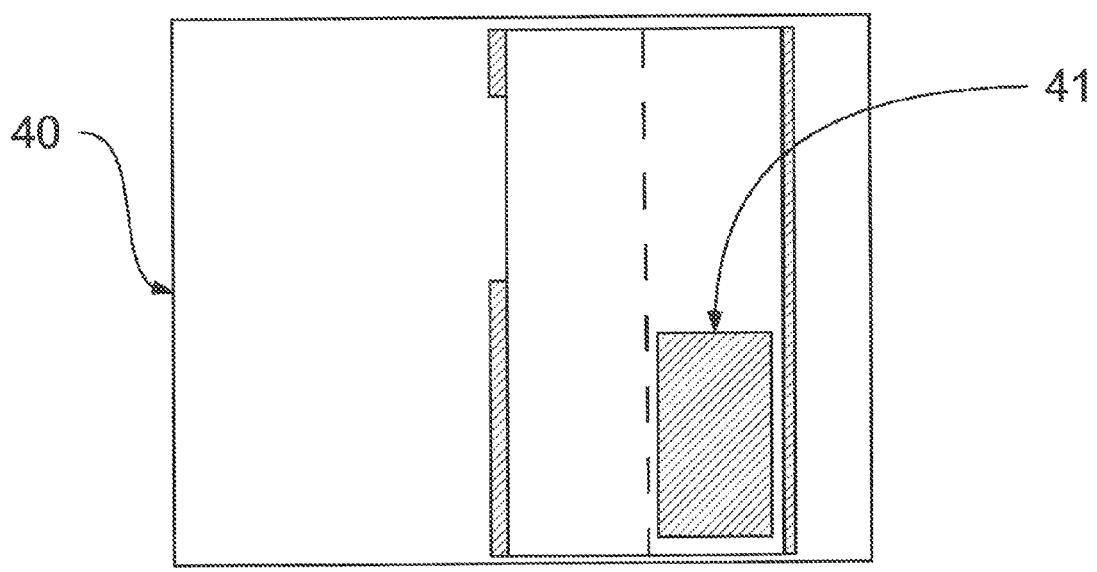
Figure 4:
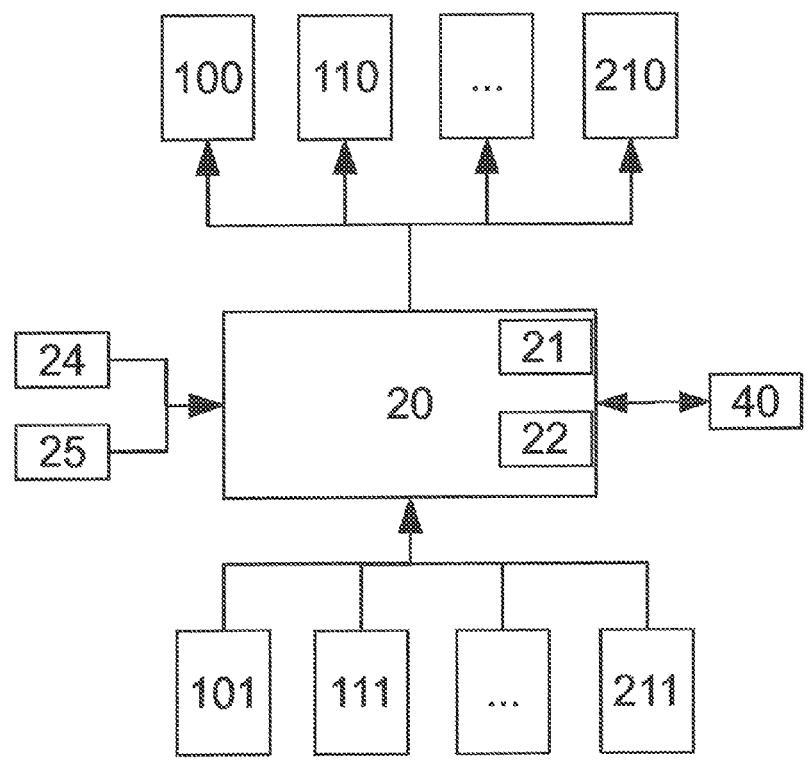
Figure 5:
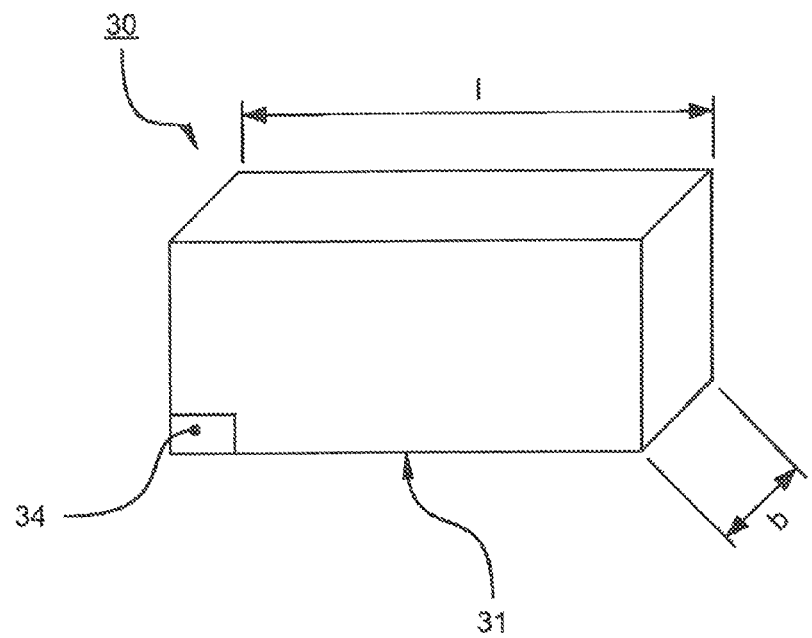
Figure 6:
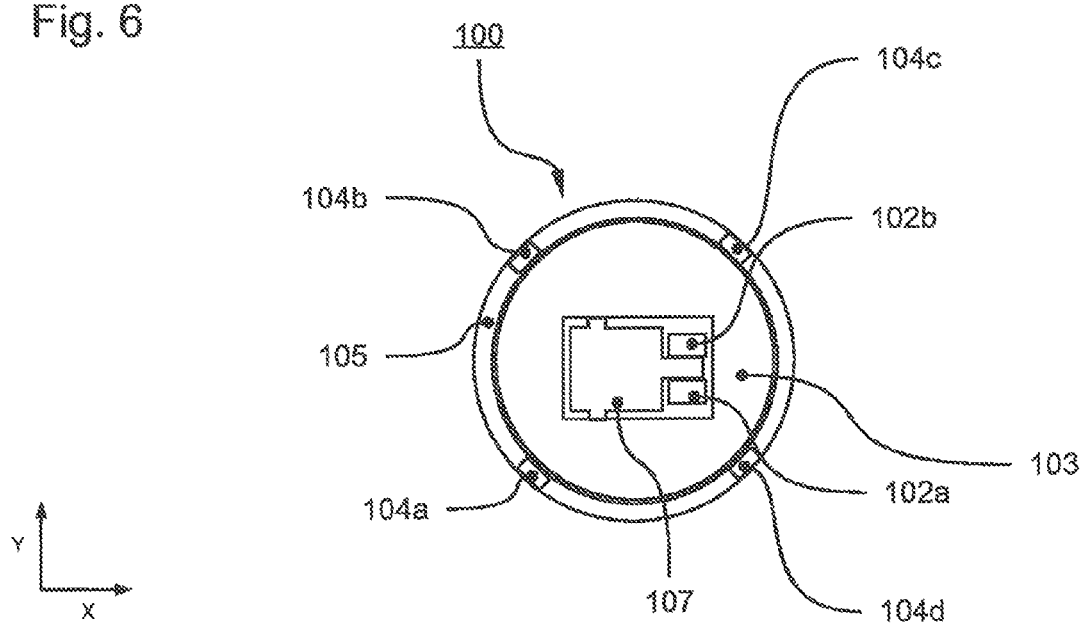

These show:

FIG. 1 a top view of a portion of a cargo deck with numerous cargo conveying devices;

FIG. 2 a first view of a touchscreen which is formed as an input device for a control computer;

FIG. 3 a second view of the touchscreen from FIG. 2;

FIG. 4 a diagrammatic depiction of a loading system comprising a control computer, a touchscreen as input device, numerous sensors and actuators;

FIG. 5 a diagrammatic depiction of a piece of cargo;

FIG. 6 a detailed view of a cargo conveying device from FIG. 1; and

Figure 7:
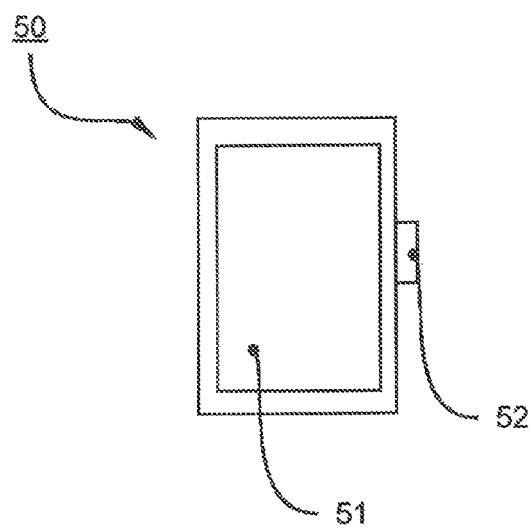

FIG. 7 a remote control unit to control the control computer.

DESCRIPTION

In the description below, the same reference numerals are used for the same parts and those with the same effect.

FIG. 1 shows a top view of a cargo deck 10 with a cargo loading system according to the invention. The portion of the cargo deck 10 shown is substantially rectangular and extends in the x-y plane (the y direction corresponds to the longitudinal direction of the aircraft and the x direction to the transverse direction) of the aircraft and is delimited by a left side wall 1 and a right side wall 2. The left side wall 1 is interrupted in portions to form a door opening 7 and has a touchscreen 40 as an input device. Through the door opening 7, a cargo container 30 as shown in FIG. 5 can be introduced into the cargo hold. The cargo loading system according to the invention is particularly suitable for transporting bulky containers which must be rotated for stowing inside the hold. The cargo loading system or loading system can however also be used in connection with substantially smaller cargo containers 30 of any dimensions. The cargo container 30 shown in FIG. 5 has a length l which is significantly longer than the width of the cargo deck 10 shown in FIG. 1 so that on loading, the cargo container 30 must be rotated in the loading and unloading region using the additional space offered by the door opening 7.

The cargo deck 10 of the aircraft shown in FIG. 1 is configured such that a first cargo loading track A and a second cargo loading track B are provided to receive individual cargo containers 30. For this centre locks 11, 11', 11", 11'" are provided along a centre plane 5 of the cargo deck 10. The cargo loading tracks A, B have a width which corresponds substantially to the width b of the cargo container 30. Normally further function elements are provided to hold the cargo containers 30 suitably in the cargo loading tracks A, B.

The loading and unloading region of the cargo deck 10 in FIG. 1 is fitted with twelve cargo conveying devices 100, 110, 120, . . . , 210. These cargo conveying devices 100, 110, 120, . . . , 210 are distributed over the loading and unloading region. Preferably the cargo conveying devices 100, 110, 120, . . . , 210 are distributed over the loading and unloading region such that a cargo container 30 to be loaded, with a cargo base outline 33, 33', 33", irrespective of its position always covers at least two, preferably at least at least three cargo conveying devices 100, 110, 120, . . . , 210. In the configuration shown in FIG. 1, the cargo conveying devices 100, 110, 120, . . . , 210 are arranged in a grid pattern comprising a multiplicity of rows (in the x direction) and columns (in the y direction). Each row of the configuration shown in FIG. 1 comprises three cargo conveying devices 100, 110, 120, . . . , 210 and each column four cargo conveying devices 100, 110, 120, . . . , 210.

It should be evident to the person skilled in the art here that any other distribution of cargo conveying devices 100, 110, 120, . . . , 210 can be selected to reach a superficial coverage of the loading and unloading region. So four, five, six, eight or significantly more cargo conveying devices 100, 110, 120, . . . , 210 can be fitted in each column or each row. Furthermore it is possible to arrange the cargo conveying devices 100, 110, 120, . . . , 210 in symmetrical and asymmetrical configurations so that the particular requirements of the respective cargo hold are fulfilled. The regular configuration shown in FIG. 1 has the advantage that the individual positions of the cargo conveying devices 100, 110, 120, . . . , 210 on the cargo deck 10 can easily be detected. However theoretically it would also be possible to use an arbitrary network of cargo conveying devices 100, 110, 120, . . . , 210 to equip the loading and unloading region, and to detect the corresponding positions.

On either side of the door opening 7, RFID sensor devices 25, 25' are arranged which can detect an RFID tag 34 on the cargo container 30 (see FIG. 5). To this extent, a control computer 20 connected with the RFID sensor devices 25, 25' is able to unambiguously identify an incoming cargo container 30. An identification number obtained can be used to determine the cargo container width b and cargo container length l, i.e. the dimensions of the cargo container 30. Alternatively the RFID tag 34 can contain concrete information on these dimensions. In a further embodiment example, a laser scanner can be arranged at the door opening 7 or at any other suitable position to determine the dimensions of the incoming cargo container 30.

The cargo conveying devices 100, 110, 120, . . . , 210 are adapted to transport the incoming cargo container 30 and move it to a specified position within the cargo loading tracks A, B. FIG. 1 shows the cargo base outlines 33, 33', 33" diagrammatically. It is clear that the cargo container 30, which is already slightly angled, has been displaced along the x axis in relation to the first cargo base outline 33 by means of the cargo conveying devices 100, 110, 120, . . . , 210 to assume the position illustrated by the second cargo base outline 33'. The third cargo base outline 33" shows a potential target position. The cargo conveying devices 100, 110, 120, . . . , 210 can for example be devices as described in DE 198 07 229 A1.

As shown in FIG. 4, the cargo conveying devices 100, 110, 120, . . . , 210 are in communicative connection with a control computer 20 so that the control computer 20 can control these individually or in groups. Furthermore it is possible to rotate the cargo conveying devices 100, 110, 120, . . . , 210 such that they can transport the cargo containers in any arbitrary direction within the plane of the cargo deck.

FIG. 1 shows diagrammatically with vector arrow r a transport direction of the cargo conveying device 110. The control computer 20 can for example actuate the cargo conveying devices 100, 110, 120, . . . , 210 such that the cargo container 30 is transported from a first position (see first cargo base outline 33) to a second position (see second cargo base outline 33'). It is possible to control the individual cargo conveying devices 100, 110, . . . , 210 selectively such that in each case only the cargo conveying device 100, 110, . . . , 210 which is engagement with the cargo container 30 is actuated. A control strategy developed by the control computer 20 can indicate which cargo conveying devices 100, 110, 120, . . . , 210 are actuated in which direction at which time.

The cargo loading system according to the invention furthermore comprises a multiplicity of sensor devices 101, 111, 121, . . . , 211 to determine an actual position of the cargo container 30 on or close to the cargo deck 10. A sensor device 101, 111, 121, . . . , 211 can comprise one or more light sensors 104a, 104b, 104c, 104d which are each arranged on a cargo conveying device 100, 110, . . . , 210 to detect whether a specific cargo conveying device 100, 110, 120, . . . , 210 is covered by the cargo container 30. Because of the distribution of sensor devices 101, 111, 121, . . . , 211 over the cargo deck 10, it is possible to determine a relatively precise position of the cargo container 30. Theoretically it would be possible to use other sensor devices to determine a more precise position of the cargo container 30. For example, position determination can take place by ultrasound. Signals from the sensor devices 101, 111, . . . , 211 allow the control computer 20 to determine the position of the cargo container 30.

The cargo conveying devices 100, 110, 120, . . . , 210 used for preference are explained in more detail below with reference to FIG. 6. FIG. 6 shows as an example a detailed view of a preferred cargo conveying device 100. The cargo conveying device 100 has an annular frame 105 and a circular rotation plate 103 arranged in the frame 105. The rotation plate 103 is mounted rotationally mobile within the frame 105 such that this can be rotated in the x-y plane about a rotation axis. The cargo conveying device 100 has corresponding actuators and sensors so that the rotation plate 103 can be oriented arbitrarily within the frame 105. Sensors give information on the orientation of the rotation plate 103 within the frame 105.

The rotation plate 103 accommodates a roller drive unit 107 which drives the drive rollers 102a, 102b. The drive rollers 102a, 102b are adapted to drive cargo containers 30 in a direction transverse to the rotation axis of the drive rollers 102a, 102b substantially within the x-y plane. It should be evident to the person skilled in the art that the cargo container 30 can be transported in the opposite direction by driving the drive rollers 102a, 102b in an opposing direction of rotation.

The preferred cargo conveying device 100 furthermore comprises four light sensors 104a, 104b, 104c, 104d which are arranged on the frame 105. To this extent the orientation of the rotation plate 103 does not affect the position of the light sensors 104a, 104b, 104c, 104d. Preferably the light sensors 104a. 104b, 104c, 104d are each arranged on opposite sides of the frame 105. Thus the first light sensor 104a lies in the 45° region of the cargo conveying device 100, the second light sensor 104b in the 135° region, the third light sensor 104c in the 225° region and the fourth light sensor 104d in the 315° region. The light sensors 104a, 104b, 104c, 104d comprise light-emitting diodes and photo diodes so that the light sensors 104a, 104b, 104c, 104d are suitable for detecting the presence of a piece of cargo immediately above the light sensors 104a, 104b, 104c, 104d.

The control computer can use the sensor signals received from the distributed sensor devices 101, 111, . . . , 211 to determine the actual position of the cargo container 30 on the cargo deck 10. Furthermore the control computer 20 is adapted to display the actual position determined on the touchscreen 40. FIGS. 2 and 3 show example depictions which can appear on the touchscreen 40. Preferably the touchscreen 40 furthermore shows diagrammatically the design of the cargo deck 10 e.g. existing door openings 7, side walls 1, 2, cargo loading tracks A, B etc. Corresponding data can be stored for example in a memory device 21 (FIG. 4).

In a first embodiment example of the loading system according to the invention, a user can select for example an image 41 of the cargo container 30 in FIG. 2 using a finger and then specify a target position by moving the finger for example on the depiction of the cargo tracks A or B. The control computer 20 receives this input and calculates a suitable transport strategy so that the cargo container 30 is transported in a suitable manner to the specified position on the cargo deck 10. FIG. 3 shows for example a diagram 41 of the cargo container 30 in the target position. To develop a suitable control strategy, the control computer 20 comprises a model generator unit 22 (FIG. 4). This model generator unit 22 has access to the data necessary for digitally modelling the configuration of the cargo deck 10.

Furthermore suitable dimensions of the cargo container 30 are available, for example the cargo container width b and cargo container length l, so that the cargo container 30 can also be suitably modelled. After modelling the cargo container 30 and the cargo deck 10, the control computer 20 develops a control strategy selected such that during its transport, the cargo container 30 has no contact with the outer skin of the aircraft.

Preferably the control computer 20 is formed such that an actual implementation of the control strategy developed takes place only as long as the touchscreen 40 detects a contact by the user. As soon as there is no contact with the touchscreen 40, the cargo container 30 is stopped. The user can thus stop the transport of the cargo container at any time by removing his finger or fingers from the touchscreen 40.

In a second embodiment example it is possible to move the cargo container 30 in segments by corresponding inputs on the touchscreen 40. For example the user can select the image 41 of the cargo container 30 from FIG. 2 and move the cargo container 30 in a type of "drag and drop" process. The control computer 20 receives these inputs and implements them suitably so that the cargo container 30 is transported accordingly on the cargo deck 10.

Preferably the control computer 20 is formed such that it provides both automatic loading and unloading (see first embodiment example), and manual loading and unloading (see second embodiment example). For example the control computer 20 can allow automatic loading of cargo container 30 with standardised dimensions, while cargo containers 30 with dimensions deviating from standard or with a projection are loaded manually.

Preferably the touchscreen 40 is formed such that it can detect at least two contacts of the touchscreen 40 simultaneously. It is thus possible to make corresponding user inputs with two fingers simultaneously. For example it would be conceivable to touch the image 41 of the cargo container in FIG. 2 on the front and rear ends simultaneously and specify a translation and/or rotation movement, so that finally the cargo container 30 assumes a position as illustrated from the first cargo base outline 33 in FIG. 1. A correspondingly equipped touchscreen 40 is particularly suitable for specifying rotation movements. In this embodiment example too, the absence of contact with the touchscreen 40 leads to the stoppage of the cargo container 30 (see first embodiment example).

In theory it is possible to control the control computer 20 completely by inputs on the touchscreen 40. However it would also be possible to provide a further input device 24 which provides further control commands. Also an RFID sensor device 25 (see FIGS. 1 and 4) can be provided at the input region of the cargo deck 10 to determine information relating to the cargo container 30 to be loaded.

Furthermore a remote control 50 (see FIG. 7) can be provided to allow further user inputs for the control computer 20. This remote control 50 can be a conventional remote control with a multiplicity of buttons and/or other input elements. Alternatively the remote control 50 can have a display device 51 that is formed e.g. as a touchscreen, similar to the touchscreen 40. A wireless communication between the control computer 20 and the remote control 50 can be created in any conceivable manner. Preferably communication takes place via light waves emitted by suitable transmitter units and received by suitable receiver units. For example the communication can take place in the infrared range. In a preferred embodiment one or more of the light sensors 104a, 104b, 104c, 104d serves as transmitter and/or receiver unit for communication with the remote control 50. The user inputs are then transferred to the control computer 20 from the corresponding cargo conveyor 100, 110, 120, ..., 210 via a wired link or wirelessly.

It is possible to determine, on the basis of manual inputs, a two-dimensional or three-dimensional model of the cargo container 30 to be loaded. Thus the loading system according to the invention can for example store in the memory device 21 two- or three-dimensional models of all common cargo container models. The user of the loading system according to the invention can then select the cargo container 30 to be loaded, for example from a list. Secondly an automatic detection of the cargo container model or cargo container type can be made. For example corresponding data necessary for production of a two- or three-dimensional model of the cargo container 30 can be stored in an RFID tag 34 (see FIG. 5). From the stored data, the control computer 20 can produce a suitable model and then develop a suitable control strategy.

Although the touchscreen 40 described above is installed fixedly on the side wall 1, it is possible to implement the invention in the form of a portable touchscreen 40. Communication with the control computer can then take place by wired link, wirelessly (e.g. via Bluetooth) or partly wirelessly. For a portable touchscreen 40, holders can be provided on the side walls 1, 2 which optionally also function as loading stations.

The invention can also be used outside aircrafts, e.g. in a logistics centre.

LIST OF REFERENCE NUMERALS 1, 2 Side wall
5 Centre plane
7 Door opening
10 Cargo deck
11, 11', 11", 11'" Centre lock
20 Control computer
21 Storage device
22 Model generator
24 Input device
25 RFID sensor device
30 Cargo container
31 Cargo base
33, 33', 33" Cargo base outline
34 RFID tag
40 Touchscreen
41 Image of cargo container
43 Image of cargo deck
50 Remote control
51 Display device
52 Transmitter device
100, 110, 120, ..., 210 Cargo conveying device
101, 111, 121, ..., 211 Sensor devices
102, 102b Drive roller
103 Rotation plate
104a, 104b, 104c, 104d Light sensor
105 Frame
107 Roller drive unit
x, y x and y direction
A Cargo loading track A
B Cargo loading track B
r Conveying device
b Cargo container width
l Cargo container length

The invention claimed is:

1. A loading system for an aircraft comprising:
a control computer;
a multiplicity of cargo conveying devices for conveying a piece of cargo on a cargo loading deck of the aircraft, wherein to control the cargo conveying devices, the control computer is communicatively connected with the cargo conveying devices;
at least one input device which is communicatively connected with the control computer to transfer user inputs to the control computer;
wherein the at least one input device comprises a touchscreen and the touchscreen is controlled by the control computer such that the touchscreen shows at least an outline of the piece of cargo, characterized in that the loading system is formed such that a user of the loading system, by means of the touchscreen, can select the piece of cargo or a portion of the piece of cargo and specify at least one transport direction and/or conveyor track.

2. The loading system according to claim 1, including sensor devices to detect an actual position of the piece of cargo.

3. The loading system according to claim 1, wherein the loading system is formed such that the user can specify a transport direction.

4. The loading system according to claim 1, wherein the touchscreen is formed to detect at least two contact points simultaneously so that a user of the loading system can specify a rotation movement.

5. The loading system according to claim 1, wherein the control computer is formed, taking into account the user inputs, to calculate a transport strategy and actuate the cargo conveying devices to implement the transport strategy.

6. The loading system according to claim 1, wherein the control computer is formed to actuate the cargo conveying devices only as long as the touchscreen detects a contact by the user.

7. The loading system according to claim 1, wherein the touchscreen is formed and/or controlled by the control computer such that a user of the loading system, by means of the touchscreen, can select at least one target position.

8. The loading system according to claim 7, wherein the control computer is formed to calculate a control strategy to actuate the cargo conveying devices such that the piece of cargo is moved from its current position to the target position.

9. The loading system according to claim 1, including sensor devices to detect the type and/or a dimension of the piece of cargo.

10. The loading system according to claim 1, including a remote control which is adapted to receive user inputs and has a wireless communication interface to pass on the user inputs to the control computer by means of a sensor of a cargo conveying device.

11. A method for conveying a piece of cargo on a cargo deck comprising the steps:
reception by a control computer of at least one user input entered by means of a touchscreen comprising the reception of at least a selection of a portion of the piece of cargo and reception of a movement direction specified by a user;
calculation by the control computer of a control strategy as a function of the user input;
actuation by the control computer of a number of cargo conveying devices according to the control strategy.

12. The method according to claim 11, including reception by the control computer of a plurality of sensor signals to determine an actual position of the piece of cargo on the cargo deck, and display on the touchscreen of the actual position of the piece of cargo.

13. The method according to claim 11, wherein actuation of the number of cargo conveying devices takes place only as long as the touchscreen detects a contact by the user.

14. The method according to claim 11, including at least one sensor device of a type and/or at least one dimension of the piece of cargo, and taking into account the type and/or dimension of the piece of cargo in calculation of the control strategy.

15. The method according to claim 11, wherein the user input comprises an input of an acceleration direction and an acceleration force, and from the user input the control computer determines a transport direction and transport time period.

\* \* \* \* \*